3,259,660
PROCESS FOR PREPARING SULFONIUM
COMPOUNDS
Merle E. Cisney, Camas, Wash., assignor to Crown Zellerbach Corporation, San Francisco, Calif., a corporation of Nevada
No Drawing. Filed Dec. 10, 1962, Ser. No. 243,637
5 Claims. (Cl. 260—607)

This invention relates to a process for preparing sulfonium compounds and more particularly to a process of preparing hydroxyaryl sulfonium chlorides.

The hydroxyaryl sulfonium chlorides are useful in many applications, for example as surface active agents, biological toxicants, and as starting materials in the synthesis of organic derivatives such as alkyl thiophenols. However, their use in these various applications has been limited by their relatively high cost.

It has been proposed to produce hydroxyaryl sulfonium chlorides by providing a mixture of an organic thioether, a phenol, and chlorine gas, and reacting this mixture at a relatively low temperature for a time sufficient to form a corresponding hydroxyaryl sulfonium chloride. Although this procedure offers certain advantages as compared to prior procedures, it is conducive to side reactions involving chlorine and phenol and thus to formation of by-products which are difficult to separate from the desired end product, i.e. sulfonium chloride. As a result, chlorination of the phenol consumes a portion of the chlorine and of the phenol introduced into the reaction mixture and hence tends to reduce the yield of the sulfonium chloride.

It is the principal object of this invention to provide an improved process for preparing sulfonium compounds, particularly hydroxyaryl sulfonium chlorides in high yields from inexpensive starting materials.

It is another important object of this invention to provide a process for making dialkyl hydroxyaryl sulfonium chlorides which process may easily and economically be carried out on a commercial scale while substantially reducing formation of undesirable by-products.

According to this invention, hydroxyaryl sulfonium chlorides may be prepared efficiently and in high yields by reacting in the first stage an organic sulfide with chlorine for a time sufficient to form a sulfide-chlorine adduct, and thereafter reacting in the second stage the adduct so produced with a phenol containing at least one unsubstituted reactive position in the aromatic ring to form a corresponding hydroxyaryl sulfonium chloride, each stage of the reaction being carried out under carefully controlled conditions.

When the foregoing chemical reagents are reacted in a liquid medium at a relatively low temperature, a hydroxyaryl sulfonium chloride is formed in accordance with the reactions which may be illustrated as follows:

(1) $R-S-R' + Cl_2 \longrightarrow [R-\underset{\underset{Cl}{|}}{S}-R']Cl$

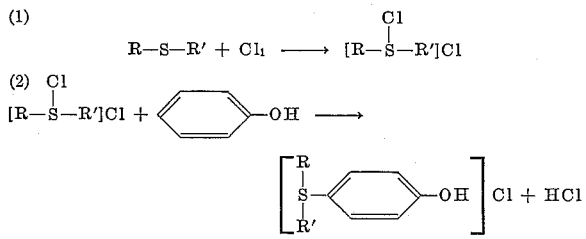

In the above formulas R and R' are radicals selected from the group consisting of alkyl of 1–20 carbon atoms, 2-chloroethyl, aryl, arylalkyl of 7–8 carbon atoms and alkylaryl of 7–10 carbon atoms.

Considering the foregoing in greater detail, the organic sulfides suitable for use in the herein described process broadly comprise those having the general formula indicated hereinabove, preferably the sulfides containing up to 20 carbon atoms and having at least one methylene group attached to the sulfur atom. Illustrative of suitable alkyl radicals are: methyl, ethyl, butyl, octyl, dodecyl and substituted derivatives thereof such as 2-chloroethyl; of aryl radicals are: phenyl, naphthyl, and substituted derivatives thereof such as halophenyl and carbethoxyphenyl; of aralkyl radicals are: benzyl, phenylethyl, and substituted derivatives thereof such as nitrophenylethyl; and of alkaryl radicals are: methylphenyl, ethylphenyl, dimethylphenyl, butylphenyl, and substituted derivatives thereof such as ethylbromophenyl. The preferred organic sulfide is dimethyl sulfide which is produced commercially in large quantities from alkaline spent liquor resulting from pulping of wood. Certain organic sulfides containing a reactive functional group other than the sulfur linkage are also suitable as starting materials in the reaction of this invention, however they are less desirable due to reaction of such functional group with chlorine.

The phenols which are suitable for use in the process of this invention comprise phenols having at least one unsubstituted reactive position in the aromatic ring. Suitable phenols include monohydroxybenzene, cresols, xylenols, butylphenols, octylphenols, nonylphenols, tridecylphenols, naphthols, monohalophenols, dihalophenols, guaiacol, catechol, resorcinol and the like. Monohydroxybenzene and m-cresol are the preferred phenols.

It will be understood that in some of the highly substituted phenols the reactive position in the aromatic ring may sterically be hindered to a point that the reaction of this invention may somewhat be inhibited and thus the yield of the desired sulfonium compounds may be reduced. Accordingly, the highly substituted phenols, while being operative, are less desirable in carrying out the reaction of this invention than unsubstituted phenols.

In addition to the three essential reactants in the process of this invention, i.e. an organic sulfide, chlorine, and a phenol, a suitable diluent may optionally be included in the first, in the second, or in both stages of the hereinabove described reaction in order to increase its efficiency and to insure an adequate heat transfer. If a diluent is employed, it should either be inert to the reactants and to the resulting reaction product or be characterized by a substantially lower reaction rate with chlorine than the sulfide, the sulfide-chlorine adduct, and the phenol. Illustrative of suitable diluents are hydrogen chloride; concentrated hydrochloric acid; phosphoric acid; alkyl halides such as methyl chloride; alkyl ethers, such as ethyl ether; alkanes such as pentane and heptane; aromatic hydrocarbons, such as toluene and xylene; and other chemicals which are liquid during the reaction in accordance with this invention. A liquid dialkyl sulfide or a phenol may also be employed as a diluent, in which case the amount thereof should be in excess of that required by the stoichiometry of the reaction. Although water and aliphatic alcohols per se are not suitable as diluents, they may be employed if saturated with hydrogen chloride gas.

In general, the organic sulfide and chlorine are reacted in approximately stoichiometric amounts, i.e., equivalent amounts required for formation of the corresponding sulfide-chlorine adduct. In the second stage of the reaction, the adduct also is reacted with the phenol in approximately stoichiometric amounts required to form the corresponding hydroxyaryl sulfonium chloride. In order to avoid undesirable side reactions, the sulfide should be employed in molar excess of chlorine and the phenol should be employed in a molar excess of the sulfide-chlorine adduct. Accordingly, the respective molar ratios of the sulfide to the chlorine and of the phenol to the adduct are preferably in excess of 1:1 and may be as high as 3:1. Still higher ratios may be employed, if desired, although no particular benefits result therefrom.

The process of this invention is preferably carried out in the first stage by providing a solution of the organic sulfide in a suitable diluent and introducing, with agitation, chlorine gas below the surface of the solution in an amount not higher that that required for the reaction with the organic sulfide. The reaction may be conducted in a suitable vessel preferably provided with agitating means and with means for cooling the reactants during formation of the reaction product. The mixture is allowed to react at a low temperature in the range of between about −50° C. and about 10° C., preferably between about −30° C. and about 0° C. for a time sufficient to produce a substantial amount of the sulfide-chlorine adduct. In general, this may require from a few seconds to about 48 hours. In a continuous process, the reaction period may be very short ranging from a few seconds to about 15 minutes depending on the feed rate of the reactants. In a batch process, the reaction time of from ½ hour to 5 hours usually is sufficient to complete formation of the adduct. As mentioned hereinabove, the efficiency of the reaction may be enhanced by providing a suitable agitation of the liquid reaction mixture so that a homogeneity of the mixture is insured and localized overheating during incorporation of chlorine gas is avoided.

The resulting sulfide-chlorine adduct is a colorless crystalline product soluble in concentrated hydrochloric acid. Due to its relative instability at a temperature higher than 0° C. which may lead to its hydrolysis to dimethyl sulfoxide or its rearrangement to monochlorosulfide, it is desirable to carry out the second stage of the reaction leading to the formation of a sulfonium compound within a relatively short time after the adduct has been prepared.

In carrying out the second stage of the reaction of this invention, the adduct preferably is added to the phenol in the presence of a liquid diluent and the mixture is reacted under agitation at a temperature between about −50° C. and about 20° C., preferably between about −20° C. and about 0° C. for a time sufficient to produce a substantial amount of the sulfonium chloride. A period of from about 30 minutes to about 5 hours usually is sufficient to complete formation of the sulfonium chloride. As mentioned hereinabove, it is preferred that the respective molar ratio of the phenol to the adduct be in excess of 1:1. In this way, formation of undesirable side reaction products is avoided. The resulting sulfonium chloride reaction product may be separated from the reaction mixture by pouring the liquid mixture into acetone, filtering to separate sulfonium chloride, washing with acetone, and drying.

The presently described process will be more fully understood from the following examples. It will be understood that these examples merely illustrate the preferred embodiments of this invention and are not intended to limit the scope thereof.

*Example 1*

10.5 grams of dimethyl sulfide (0.17 mole) are placed in a 3-neck flask fited with a sealed stirrer, a thermometer, a fritted gas inlet tube extending as deeply as possible down into the flask, and a vent for exit gas. The flask is placed in a Dry Ice-acetone bath to cool the dimethyl sulfide to −10° C. Gaseous chlorine is incorporated through the gas inlet tube into dimethyl sulfide in an amount of 10.6 grams (0.15 mole) over a period of 35 minutes. During addition of chlorine, the temperature of the reaction mixture is maintained at about −10° C. After addition of chlorine is complete, the reaction product containing a substantial proportion of the dimethyl sulfide-chlorine adduct is transferred into another 3-neck flask fitted with a sealed stirrer, a thermometer and a gas outlet tube and containing a mixture of 14.6 grams of m-cresol (0.14 mole) and 9.7 grams of p-cresol (0.09 mole). The cresols are cooled to about −5° C. by placing the flask in Dry Ice-acetone bath. During the addition of the adduct to the cresols, the temperature of the reaction mixture is maintained between −20° C. and −10° C. After addition of the adduct is complete the mixture is allowed to stand for 2 hours during which time the temperature is allowed to rise to 15° C. At the end of this period of time the reaction is substantially complete. The resulting reaction product, i.e. 2-methyl-4-hydroxyphenyl dimethyl sulfonium chloride is poured into acetone, then filtered, washed with acetone and dried. The total yield of the product in the form of white crystals is 22.2 grams corresponding to a yield of 80% based on theoretical.

*Example 2*

The process of Example 1 is repeated, except that 105 grams of dimethyl sulfide is admixed with 121.5 grams of concentrated hydrochloric acid (37% HCl) prior to the introduction of chlorine gas in an amount of 106 grams. The amounts of the m-cresol and p-cresol employed in the second stage of the reaction are 146 grams and 97 grams, respectively. A yield of 248 grams of 2-methyl-4-hydroxyphenyl dimethyl sulfonium chloride corresponding to 89% of theoretical is obtained.

*Example 3*

The process of Example 2 is repeated, except that monohydroxybenzene is employed in lieu of the mixture of cresols. The amount of monohydroxybenzene employed is 127 grams (1.35 moles). The yield of 4-hydroxyphenyl dimethyl sulfonium chloride is 240 grams (93.0% of theoretical).

*Example 4*

The process of Example 2 is substantially followed except that m-cresol is employed instead of monohydroxybenzene in the amount of 146 grams (1.35 moles). The yield of white crystalline 4-hydroxy-2-methylphenyl dimethyl sulfonium chloride is 254 grams, corresponding to a 91.5% yield based on theoretical.

*Example 5*

The procedure of Example 2 again is followed, except that dioctyl sulfide is employed instead of dimethyl sulfide, and heptane is employed instead of concentrated hydrochloric acid as a diluent. During addition of chlorine the temperature of the reaction mixture is maintained between −15° C. and −10° C. The yield of the resulting 4-hydroxy-2-methylphenyl dioctyl sulfonium chloride is 325 grams (60% of theoretical).

*Example 6*

The procedure of Example 2 is substantially followed, except that methylphenyl sulfide in the amount of 149 grams (1.2 moles) is employed instead of the dimethyl sulfide. In the second stage, the resulting adduct is reacted with o-cresol in the amount of 108 grams (1.0 mole). The yield of the resulting reaction product, i.e., phenyl-4-hydroxy-3-methylphenyl methyl sulfonium chloride is 168 grams, corresponding to a 63.6% yield based on theoretical.

It will be apparent from the foregoing disclosure that the improved process of this invention offers several significant advantages including high yields of the resulting sulfonium chlorides which greatly enhance the economic aspects of their manufacture on a commercial scale.

It will be understood that the present invention may be modified in numerous respects without departure from its essential spirit and it is therefore intended to be limited only by the scope of the appended claims.

I claim:

1. A process for preparing a hydroxyaryl sulfonium chloride comprising:

(a) providing an organic sulfide compound of the formula R—S—R′ wherein R and R′ are radicals selected from the group consisting of alkyl of 1–20 carbon atoms, 2-chloroethyl, aryl, arylalkyl of 7–8 carbon atoms and alkylaryl of 7–10 carbon atoms, at least one of said R and R' having a methylene group which is attached to the sulfur atom;

(b) reacting chlorine with said organic sulfur compound at a temperature between about —50° C. and +10° C. to thereby form an organic sulfide-chlorine adduct;

(c) and reacting said organic sulfide-chlorine adduct with a phenol selected from the group consisting of monohydroxybenzene, cresols, xylenols, butylphenols, octylphenols, nonylphenols, tridecylphenols, naphthols, monohalophenols, dihalophenols, guaiacol, catechol and resorcinol at a temperature between about —50° C. and +20° C. to form the corresponding hydroxyaryl sulfonium chloride.

2. The process of claim 1 wherein said organic sulfide is a dialkyl sulfide containing up to 20 carbon atoms.

3. The process of claim 2 wherein said phenol is selected from the group consisting of monohydroxybenzene and cresol.

4. The process of claim 1 wherein said organic sulfide is dimethyl sulfide.

5. The process of claim 4 wherein said phenol is selected from the group consisting of monohydroxybenzene and cresols.

No references cited.

CHARLES B. PARKER, *Primary Examiner.*

DANIEL D. HORWITZ, *Examiner.*

ROBERT V. HINES, *Assistant Examiner.*